United States Patent
Usui

(10) Patent No.: US 7,092,211 B2
(45) Date of Patent: Aug. 15, 2006

(54) TAPE CLEANER HAVING A WEFT ARRANGED PERPENDICULAR TO A RUNNING DIRECTION OF A TAPE

(75) Inventor: Mitsunobu Usui, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 373 days.

(21) Appl. No.: 10/673,436

(22) Filed: Sep. 30, 2003

(65) Prior Publication Data

US 2004/0066725 A1 Apr. 8, 2004

(30) Foreign Application Priority Data

Oct. 3, 2002 (JP) ............................. 2002-291186

(51) Int. Cl.
*G11B 23/50* (2006.01)
*G11B 7/03* (2006.01)
*G11B 5/41* (2006.01)
*G11B 3/58* (2006.01)

(52) U.S. Cl. ...................................... 360/137; 720/746
(58) Field of Classification Search ................ 720/746; 360/137; 139/420 R, 426 R; 369/72
See application file for complete search history.

(56) References Cited

U.S. PATENT DOCUMENTS 4,916,564 A * 4/1990 Fritsch ........................ 360/128

FOREIGN PATENT DOCUMENTS

| EP | 0869481 A1 * | 10/1998 |
| JP | 05-282667 (A) | 10/1993 |
| JP | 11-175951 A * | 7/1999 |

OTHER PUBLICATIONS

Scotch Video and Audio Essentials Frequently Asked Questions, Mar. 18, 2006, multimedia.mmm.com/mws/mediawebserver.dyn!6666660Zjcf6IVs6EVs666f47COrrrrQ-.*
Fujifilm Consumer AV-Video Products, Mar. 18, 2006, www.fujifilm.com*
Maxell USA Products What's New Tech Info Recent News, Mar. 18, 2006, www.maxell-usa.com*
Best Buy Search Results, Mar. 18, 2006, www.bestbuy.com.*

* cited by examiner

*Primary Examiner*—Julie Anne Watko
(74) *Attorney, Agent, or Firm*—Sughrue Mion, PLLC

(57) ABSTRACT

A tape cleaner with a cleaning tape to wipe out dirt adhered to a surface of a tape is composed to wipe out the dirt adhered to the surface of the tape by pressing said cleaning tape on a surface of a running tape, and the cleaning tape is composed so that a weft made of an ultra fine fiber is exposed more outside than a warp and the weft is vertically arranged for a running direction of the tape.

9 Claims, 2 Drawing Sheets

Tape Running Direction

TAPE CLEANER HAVING A WEFT ARRANGED PERPENDICULAR TO A RUNNING DIRECTION OF A TAPE

FIELD OF THE INVENTION

The present invention relates to a tape cleaner, in particular, to a tape cleaner of which capacity of wiping out dirt is high.

BACKGROUND OF THE INVENTION

Conventionally, for example, a tape cleaner disposed at a winder, servo writer, and the like used in manufacturing processes of a magnetic tape cartridge wipes out dirt adhered to a surface of a magnetic tape by pressing a surface of a running cleaning tape on it (for example, see Japan patent laid open publication 5-282667 and 11-175951).

However, because a conventional tape cleaner uses a non-woven cloth and tightly flat-woven cleaning tape, cleaning of a magnetic tape cannot be sufficiently performed according to a speed of the magnetic tape and the like if any.

SUMMARY OF THE INVENTION

An exemplary object of the present invention is to provide a tape cleaner which can efficiently perform cleaning of a magnetic tape.

The tape cleaner related to the invention, which is provided with a cleaning tape to wipe out dirt adhered to a tape surface and is composed so as to wipe out the dirt adhered to the tape surface by pressing the cleaning tape on a running tape surface, is characterized in that the cleaning tape is composed so that a weft consisting of an ultra fine fiber is exposed more outside than a warp, and the weft is arranged vertically (or perpendicular) to a running direction of the tape.

According to the tape cleaner as composed above, because the weft is vertically arranged for the running direction of the tape, it can scrape off dirt which moves adhered to the tape surface and efficiently remove the dirt.

DESCRIPTION OF THE PREFERRED EMBODIMENTS

Hereafter, one embodiment of a tape cleaner related the present invention is described in detail, referring to drawings. In the embodiment, the tape cleaner related to the invention is assumed to be applied to a tape winder.

Figure 1:
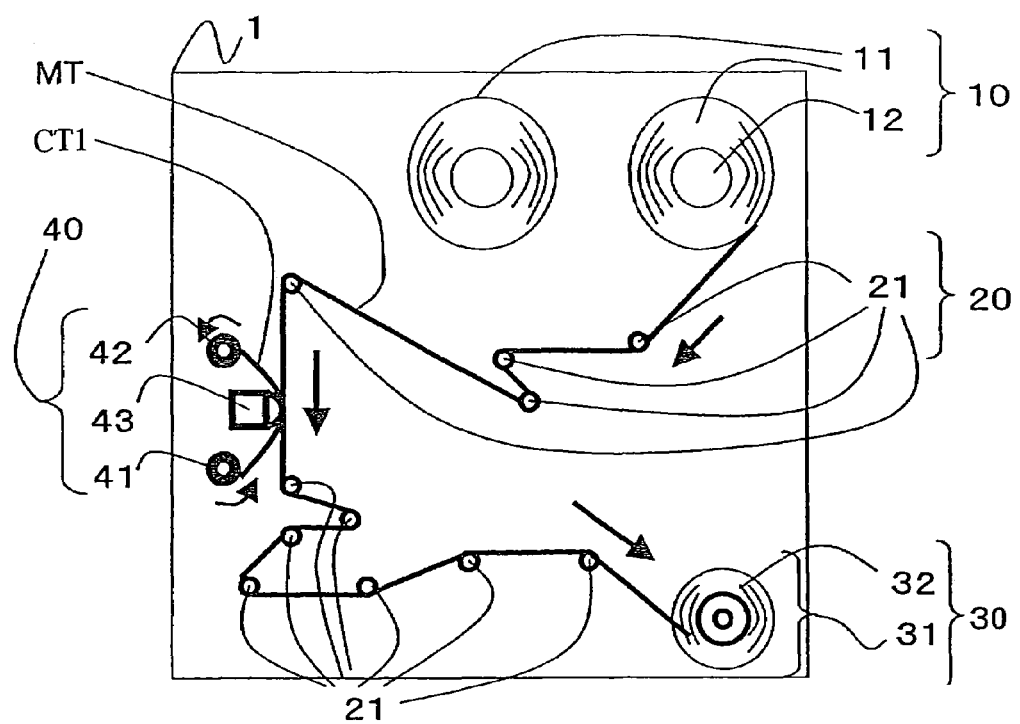
FIG. 1 is a configuration drawing related to the present invention.

Firstly, a configuration of the tape winder to which the tape cleaner related to the invention is applied is described referring to FIG. 1.

A tape winder 1 shown in FIG. 1 is a winder to cut a magnetic tape MT wound out from a pancake at a predetermined length and to wind in a tape reel 31, and is mainly provided with a tape supplying unit 10 supplying the magnetic tape MT, a running unit 20 running the tape MT, a winding unit 30 winding the tape MT in the tape reel 31, and a tape cleaner unit 40 wiping out dirt adhered to a surface of the tape MT. Meanwhile, the tape cleaner unit 40 corresponds to a tape cleaner in claims. Hereafter, each unit is described in detail.

The tape supplying unit 10 is a unit to supply the magnetic tape MT manufactured through predetermined processes. Therefore, the supplying unit 10 includes a pay-off reel 12 paying off pancakes 11 which are slitted into a tape width established in a product standard from a wider magnetic tape (mother tape) manufactured through the predetermined processes, and a motor (not shown in the drawing) for the pay-off reel providing power to rotate the reel 12. Here, the pancakes 11 are plurally disposed so that one which finishes supplying the tape MT is efficiently changed.

The tape running unit 20 is a unit to run the tape MT within the tape winder 1. Therefore, the running unit 20 has a plurality of transport guides 21 in order to run the tape MT from the tape supplying unit 10 to the tape winding unit 30.

The winding unit 30 is a unit to wind the tape MT in the tape reel 31. Therefore, the winding unit 30 includes the reel 31, a winding shaft 32 around which the reel 31 is attached, a motor (not shown in the drawing) for the winding shaft which provides power to rotate the shaft 32, a tape cutting means (not shown in the drawing) to cut the tape MT at a predetermined length, and a cartridge changing means (not shown in the drawing) to change the reel 31, in which the tape MT is wound, to a reel in which another tape MT is not wound.

The tape cleaner unit 40 is a unit to wipe out dirt adhered to the surface of the tape MT. Therefore, the cleaner unit 40 is provided with a cleaning tape CT1 to wipe out the dirt adhered to the tape surface, a cleaner pay-off reel 41 to pay off the cleaning tape CT1, a cleaner winding reel 42 to wind the tape CT1, a cleaner head 43 to press the tape CT1 on the tape MT, a motor (not shown in the drawing) for the cleaner pay off reel to provide power to rotate the cleaner pay-off reel 41, and a motor (not shown in the drawing) for the cleaner winding reel to provide power to rotate the winding reel 42.

Then, the cleaner unit 40 wipes out the dirt adhered to the surface of the tape MT pressing the tape CT1 which is run by the cleaner head 43, with running the tape CT1 from the cleaner pay-off reel 41 to the winding reel 42.

Figure 2:
FIG. 2 is an enlarged drawing of a cleaning tape used in a tape cleaner related to the invention.
Figure 2:
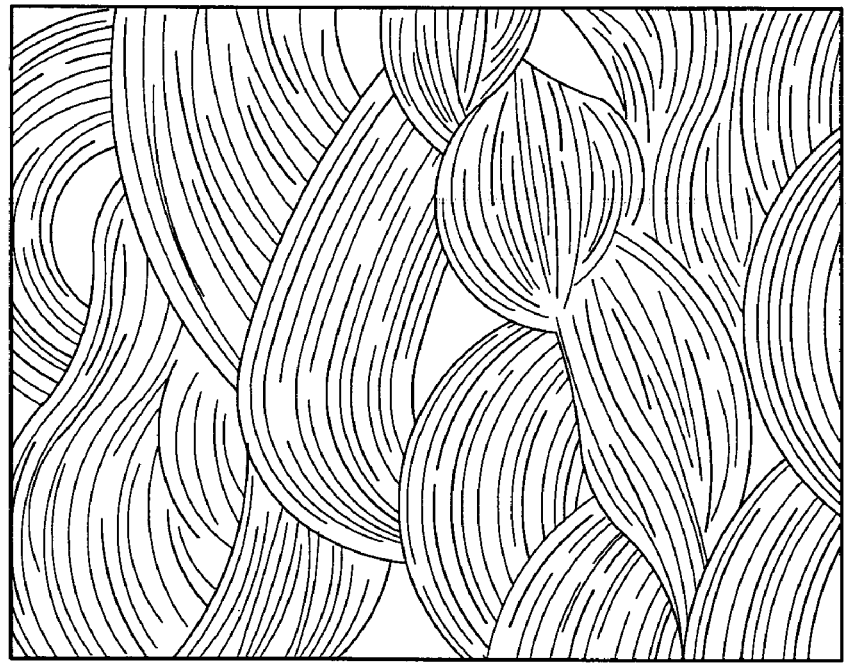

The tape CT1 is a cloth manufactured using ultra fine fibers and is adjusted after being woven so that a warp is exposed more outside than a weft. Then, the weft of the tape CT1 is arranged so as to be approximately vertical for the running direction of the tape MT. FIG. 2 is an enlarged drawing showing the tape CT1. In FIG. 2, the weft is in up/down directions and arranged vertically for the running direction of the tape MT. The warp does not surface being in a state covered with the weft.

Meanwhile, the ultra fine fibers one of which fiber is made as fine as equal or less than one denier is, for example, manufactured by such a sea-island type of fiber manufacturing method using two kinds of fibers different in solubility.

When making the tape CT1 used in the invention, after weaving mother strings of the ultra fine fibers in a compound state of both sea and island thereby making a cloth, refine the cloth by unweaving it. Then, after making sea compositions dissolve and spaces had among fibers, relax the unwoven cloth. Furthermore, after drying, fix a shape by a heat-set process.

In such the process, a high shrinkage string is used as the warp. For example, a use of a special high shrinkage string KIS manufactured by Kuraray Co., Ltd is preferable because the string is difficult to elongate by heat/tension after shrinkage.

That is, after sea portions of the sea-island fibers dissolve, the wefts are loosened by making the warps shrink, thereby the latter being exposed more outside than the former. Thus, the wefts expand to have an elasticity.

Meanwhile, the sea portions used as the ultra fine fibers consist of 100% of polyethylene terephthalate (PET).

According to the tape cleaner unit 40 composed as described above, because the cleaning tape CT1 in which the wefts are vertically arranged for the running direction of the tape MT is provided, the dirt adhered to the surface of the tape MT can be efficiently removed by the wefts of the tape CT1 closely contacting with the surface of the tape MT.

Moreover, although a conventional tape cleaner has a problem that in the case of running speed-up of the tape, its cleaning cannot be sufficiently performed due to shortening of contact time of a cleaning tape with the tape, the tape cleaner unit 40 of the non-limiting embodiment of FIG. 1 of the present invention enables cleaning of the tape MT to be sufficiently performed thanks to a close contact of the cleaning tape CT1 with the tape MT even when the running speed of the tape MT is increased.

Next, a non-limiting embodiment to wipe out dirt adhered to a surface of the magnetic tape MT is described comparing with a comparison example. Here, the dirt adhered to the surface of the tape MT is wiped out by the cleaning tape CT1 used in the present embodiment and a cleaning tape conventionally used (not shown), thereby an amount of the dirt removed from each cleaning tape is compared.

To be more precisely, firstly attach/fix a cleaning tape on a flat table. Then, after adhering powders of instant coffee to a magnetic tape as dirt, measure weight of the magnetic tape and dirt together. Attach/fix the magnetic tape on a rectangular metal block with a length of 60 mm. Because a width of the magnetic tape is 12.7 mm (0.5 inch), a magnetic tape surface with 60 mm in length and 12.7 mm in width contacts with the cleaning tape. Meanwhile, a weight of the metal block is 250 g.

Being kept downward, attached on the metal block, and placed on the cleaning tape, the magnetic tape was slowly moved about 100 mm in its longitudinal direction.

Then, removing the magnetic tape from the metal block and measuring its weight, a weight difference before/after cleaning was made a removal amount of the dirt.

The test was also performed in the cleaning tape made of a conventional split type fiber and results were compared. They are summarized and shown in TABLE 1.

TABLE 1

|  | CT1 | conventional cleaning tape |
| --- | --- | --- |
| Dirt Adherence Amount | 0.320 g | 0.348 g |
| Dirt Removal Amount | 0112 g | 0.048 g |
| Dirt Removal Ratio | 36.6% | 11.5% |

As shown in TABLE 1, in the cleaning tape CT1, the dirt removal ratio is 36.6%, and in the conventional cleaning tape, it is 11.5%. Accordingly, the tape CT1 is confirmed to be able to obtain a more excellent effect than the conventional cleaning tape.

As described above, although one embodiment of the present invention is described, the invention is not limited to this and various variations are possible as far as embodiments are based on technical ideas of the invention.

For example, although the present embodiment is assumed to apply a tape cleaner related to the invention to a tape winder, the tape cleaner related to the invention can be applied to a servo writer and the like. Moreover, not limited to the magnetic tape, it is also applicable to such a recording medium tape which writes signals on a tape by light.

What is claimed is:

1. A tape cleaner, comprising:
a cleaning tape to wipe out dirt adhered to a surface of a tape, said cleaning tape operative to wipe out the dirt adhered to the surface of said tape by pressing said cleaning tape on a surface of said tape while said tape is running,
wherein said cleaning tape is composed of a weft and a warp, where said weft is made of an ultra fine fiber and is exposed more on an outside portion of said cleaning tape than said warp, and
wherein, said weft is arranged perpendicular to a running direction of said tape.

2. A tape cleaner according to claim 1, wherein said ultra fine fiber is a sea-island fiber.

3. A tape cleaner according to claim 2, wherein a portion of said ultra fine fiber is made of polyethylene terephthalate.

4. A tape cleaner according to claim 3, wherein said tape is a magnetic tape.

5. A tape cleaner according to claim 3, wherein said tape is an optical recording tape.

6. A tape cleaner according to claim 2, wherein said tape is a magnetic tape.

7. A tape cleaner according to claim 2, wherein said tape is an optical recording tape.

8. A tape cleaner according to claim 1, wherein said tape is a magnetic tape.

9. A tape cleaner according to claim 1, wherein said tape is an optical recording tape.

* * * * *